Patented May 3, 1938

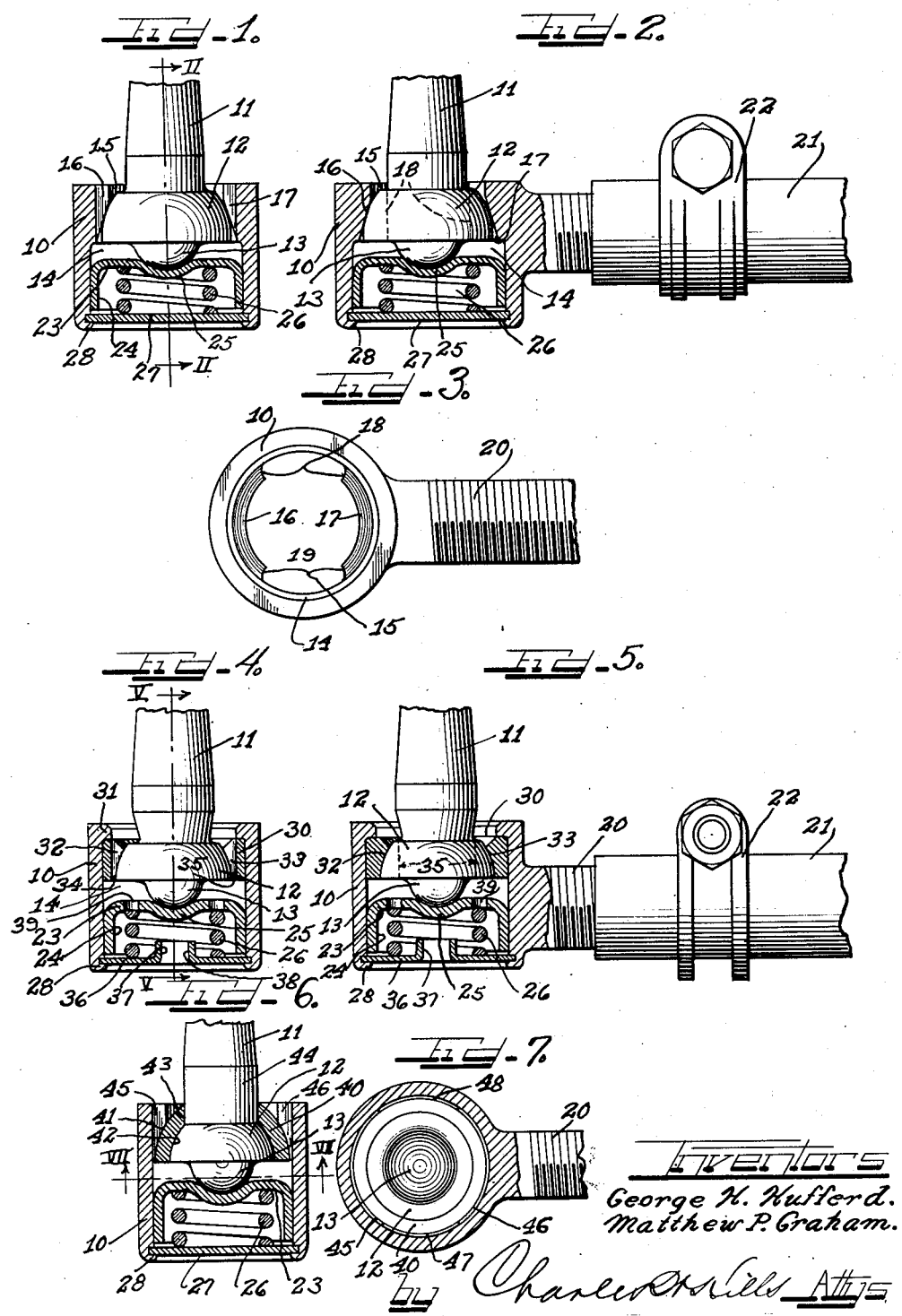

2,115,774

UNITED STATES PATENT OFFICE 2,115,774

JOINT

George H. Hufferd and Matthew P. Graham, Detroit, Mich., assignors to Thompson Products Incorporated, Cleveland, Ohio, a corporation of Ohio Application November 23, 1934, Serial No. 754,424

1 Claim. (Cl. 287—90)

This invention relates to joint constructions having bearing surfaces alternating with nonbearing portions for permitting full bearing engagement irrespective of the wearing away of the bearing surfaces.

More specifically, this invention relates to joints suitable for use in drag links and tie rod connections and having studs extending therefrom in bearing relation with the joint housing on at least two separate bearing surfaces in the housing in spaced relation, said bearing surfaces being disposed in a direction encountering the most movement during use of the joint.

Tie rod joints have heretofore been provided with compensating means to take up for wear of the bearing surfaces in order that the stud element of the joint might be maintained in full bearing contact with the bearing surfaces of the housing. However, these bearing surfaces always extended entirely around the inside periphery of the housing. Usually the stud element is attempted to be urged into full seating cooperation with the circumferential bearing surfaces of the housing by means of a spring member or other resilient device.

However, the studs of tie rod joints are subjected to tilting action in one plane more than in other planes, so that those portions of the bearing surface of the housing permitting tilting in this plane wear away more rapidly than do those portions of the bearing surfaces which are not subjected to so much movement. As a result, the bearing portions subjected to less wear are not worn down evenly with the other portions during use of the joint, and the stud element cannot be urged into full seating engagement with the worn away portion because of these unworn portions. Consequently, the stud element soon becomes loosened in the joint housing and rattles because the spring member cannot urge the element into full seating engagement with the housing bearing surface. This difficulty is especially encountered in tie rod constructions for independently sprung front wheels of automobile vehicles, wherein the free vertical movement of the wheels causes an increased tilting of the tie rod joint studs in one plane, whereas tilting in other planes is not increased. This increased tilting movement is in a plane containing the axis of the tie rod, or a plane parallel thereto.

We have now provided a tie rod construction wherein the bearing surfaces of the housing are cut away except where the main bearing contact due to this increased tilting movement takes place. With this arrangement the stud may freely tilt in any direction relative to the tie rod and at the same time the stud can be urged into full circumferential contact with the localized bearing surfaces of the housing irrespective of the wear of said bearing surfaces.

It is therefore an object of this invention to provide a joint construction having localized bearing surfaces so arranged as to be in full circumferential contact with the stud element irrespective of the amount of wear of said surfaces during use of the joint.

A further object of this invention is to provide a joint structure having a stud element freely rotatable and tiltable with respect to a housing member and capable of being maintained in full circumferential contact with discontinuous bearing surfaces of said housing member irrespective of the amount of wear encountered during use of the joint.

It is a further object of this invention to provide a joint housing with a pair of spaced bearing surfaces positioned where the bearing load is greatest.

A specific object of this invention is to provide a joint structure with a freely rotatable and tiltable stud element extending from a housing member and with the bearing surfaces of said housing member so arranged and localized that the stud can be urged into full annular contact therewith irrespective of the amount of wear of said surfaces.

Other and further objects of this invention will be apparent from the following description and annexed sheet of drawings which forms a part of this specification:

On the drawing:

Figure 1 is a central cross-sectional view of a joint housing having pairs of bearing surfaces therein according to this invention, and illustrating the stud element in elevation.

Figure 2 is a cross-sectional view taken substantially along the line II—II of Figure 1 with parts in elevation.

Figure 3 is a bottom plan view of the joint housing shown in Figures 1 and 2.

Figure 4 is a central cross-sectional view of an alternative form of joint housing according to this invention with a stud element extending therethrough shown in elevation.

Figure 5 is a cross-sectional view taken substantially along the line V—V of Figure 4 with parts in elevation.

Figure 6 is a central cross-sectional view of another form of joint housing according to this invention, showing the stud element extending therethrough in elevation.

Figure 7 is a cross-sectional view taken substantially along the line VII—VII of Figure 6 with parts in elevation.

As shown on the drawing:

In Figures 1, 2 and 3 the reference numeral 10 indicates generally a joint housing having a stud element extending therefrom in freely rotatable and tiltable relation therewith. The stud element 11 is provided near the end thereof with a segmental spherical bearing surface 12 and a hemi-spherical ball end 13. The joint housing defines an enlarged cylindrical chamber 14 extending through the bottom of the housing, and a smaller cylindrical chamber 15 through which the stud element extends from the housing. A pair of spaced frusto-conical bearing surfaces 16 and 17 are disposed at opposite sides of the joint housing and have cut away non-bearing portions 18 and 19 (Figure 3) therebetween. As shown in Figure 3, the bearing surfaces 16 and 17 are on opposite sides of a plane normal to a plane containing the axis of the shank portion 20 which extends laterally from the housing 10 into threaded engagement with the end of a tie rod 21 (Figure 2). The shank 20 is held in proper threaded position in the tie rod end 21 by means of a clamp 22.

A dished member 23 having side walls 24 for engagement with the side walls of the housing 10 and a depressed center portion 25 is inserted in the chamber 14 of the housing. A helical coiled spring 26 is placed in the dished cap 23 and is held therein under compression by means of a closure plate 27 which is secured in place by peening over the metal of the joint housing, as shown at 28. The depressed portion 25 of the cap member 23 is adapted to receive the ball end 13 of the stud element 11. The spring 26 urges the cap member into engagement with the ball end and forces the bearing portion 12 of the stud element 11 into proper seating relation with the bearing surfaces 16 and 17 of the housing.

The segmental spherical bearing portion 12 of the stud 11 makes a line contact with the frusto conical bearing surfaces 16 and 17 of the housing, and as these bearing surfaces wear away during use of the joint, the stud member is forced upwardly to continuously reseat itself. Since most of the tilting action, as pointed out above, is in a plane containing the axis of the tie rod, the bearing surfaces are so disposed in the joint housing as to fully provide for the wearing action. The non-bearing portions 18 and 19 do not contact the stud bearing portion 12 and thus cannot prevent the stud from reseating itself as the bearing surfaces 16 and 17 wear away. It is obvious that if the bearing surfaces 16 and 17 were extended circumferentially around the joint housing, those portions not subjected to wear would prevent the stud from moving upwardly in the housing and eventually the stud bearing portion 12 would be actually spaced from those portions of the bearing surfaces which are subjected to the most wear.

In Figures 4 and 5, another form of joint construction embodying the principles of this invention is shown. Identical parts have been marked with the same reference numerals used in Figures 1 to 3 inclusive. In the modification shown in Figures 4 and 5, however, the bearing surfaces of the housing 10 are not formed integral with the housing, but are formed on an annular member 30 in tight frictional engagement in the cavity 14 of the housing with the side walls thereof. The top of the housing is provided with an inturned annular flange 31. The seating member 30 is forced into the housing from the bottom thereof and abuts the flange 31. The insert may be placed in the housing by a die press or by heating the housing and allowing the same to contract around the insert so that it is maintained in fixed position in the chamber 14.

The member 30 is provided with two spaced segmental spherical bearing portions 32 and 33 similar to the frusto-conical bearing portions 16 and 17 shown in Figures 1 to 3. The segmental spherical bearing portions 32 and 33 alternate with cut away non-bearing portions 34 and 35. The segmental spherical bearing portion 12 of the stud member 11 is forced into full bearing contact with these localized segmental spherical bearing portions 32 and 33 instead of into a line contact as shown in Figures 1 and 2 where the housing bearing surfaces are conical in shape. The localized bearing surfaces 32 and 33 are on opposite sides of a plane normal to a plane containing the axis of the tie rod while the non-bearing portions 34 and 35 are on opposite sides of a vertical plane containing the axis of the tie rod since the tilting action of the stud member 11 is more pronounced in the vertical plane containing the axis of the tie rod.

The closure plate member for the joint housing 10, as shown in Figures 4 and 5, comprises a flat plate 36 having an inturned flange 37 defining an opening through which lubricant may be inserted. A plug (not shown) may be force fitted into this opening or may be in screw thread relation with the opening. The dished cap member 23 may be provided with holes 39, as shown in Figures 4 and 5, so that lubricant inserted through the opening in the closure plate 36 can pass through the cap 23 to lubricate the bearing surfaces of the joint.

In Figures 6 and 7, another form of joint construction is illustrated embodying the principles of this invention. Identical parts have been marked with the same reference numerals used in Figures 1 to 5 inclusive.

As shown in Figures 6 and 7, the segmental spherical bearing portion 12 of the stud 11 is circumscribed by a hemi-spherical seating member 40 having an outside segmental spherical bearing surface 41 and an inside segmental spherical bearing surface 42. The seating member 40 is also provided with a cylindrical bearing surface 43 defining a circular opening through which the stud 11 projects. A bearing surface 44 is formed on the stud 11 for engagement with the cylindrical surface 43 of the seating element.

The joint housing has formed therein a pair of localized segmental spherical bearing surfaces 45 and 46, alternating with a pair of non-bearing portions 47 and 48.

The seating member 40 may be coined by a simple stamping operation and the stud element 11 is urged into seating engagement with the member 40 by the spring retained cap 23 in an identical manner described above in connection with Figures 1 and 2.

As the stud element 11 is tilted relative to the housing 10, the tilting movement is transmitted to the coined seating member 40 through the bearing surfaces 44 and 43. The outside bearing surface 41 of the seating member slides on the bearing surfaces 45 and 46 of the housing. At the same time, the stud element is always freely rotatable relative to the housing since the segmental spherical bearing portion 12 of the stud element is in bearing engagement with the inside bearing surface 42 of the seating member 40.

Since the outer bearing surface 41 of the seating element 40 is in bearing engagement with the pair of localized segmental spherical bearing surfaces 45 and 46 of the housing 10 and is spaced from the portions 47 and 48, the seating member on the stud can be urged into full bearing engagement with these localized housing bearing surfaces irrespective of the amount of wear encountered. If the bearing surface 45 or 46 were extended entirely around the housing wall, a wearing of oppositely disposed portions of this housing would occur at the point subjected to the most movement. The other oppositely disposed portions would not wear away as much and would prevent the stud element from being forced into full bearing engagement with the worn-away portions. As a result, the seating element would be loosened at these points and the joint structure would rattle and eventually be unfit for use. As pointed out above the stud is tilted most in a vertical plane containing the axis of the tie rod and those portions of the housing bearing surface on opposite sides of a plane normal to a plane containing the axis of the tie rod are subjected to most wear. Those portions of the housing bearing surfaces on opposite sides of the vertical plane containing the axis of the tie rod, are subjected to little or no wear. Therefore, these last named bearing portions are now dispensed with according to this invention so that they will not prevent an automatic adjustment of the stud element to compensate for wear of the housing bearing surfaces.

Each localized bearing surface preferably extends around about one fourth of the circumference of the housing. In other words, this invention provides for the cutting away of two opposite one fourth sections of the full circumferential housing bearing surface used heretofore.

It should be understood that this invention is applicable to any form of joint construction embodying the principles of the constructions illustrated in Figures 1 to 7. Thus the bearing surfaces of the housing may be formed integral with the housing as shown in Figures 1, 2, 3, 6 and 7 or may be inserted as a separate element into the housing as shown in Figures 4 and 5. The bearing surfaces themselves may be frusto-conical in shape, as shown in Figures 1 to 3, or segmental spherical in shape as shown in Figures 4 to 7. The bearing surface of the stud may directly engage the bearing surface of the housing as shown in Figures 1 to 5, or a seating member may be interposed between the stud member and the joint housing as shown in Figures 6 and 7. The principle of this invention can also be embodied in other forms of joint structures.

Having now described our invention, we claim as our invention:

In a joint including a housing having an inner bearing wall, a stud having an end in bearing relation to said wall for swivelling and tilting movement of said stud with respect to said housing, and means constantly urging said end and wall into closer bearing relation, said wall being arranged for bearing contact with said stud over the localized areas within which most of said tilting movement takes place and being relieved between said areas, whereby said means is at all times effective to urge said end and wall into reseating bearing relation to compensate for continued wear within said localized areas.

GEORGE H. HUFFERD.
MATTHEW P. GRAHAM.